United States Patent [19]

Kuwabara et al.

[11] Patent Number: 4,541,097
[45] Date of Patent: Sep. 10, 1985

[54] GAS LASER DEVICE WITH PLURAL ELECTRODE MEMBERS ON THE UPPER GAS FLOW SIDE

[75] Inventors: Kouji Kuwabara; Kouji Sasaki; Hiroyuki Sugawara, all of Hitachi; Toshiharu Shirakura, Toukai; Yukio Kawakubo; Satoshi Takemori, both of Hitachi, all of Japan

[73] Assignee: Hitachi, Ltd., Tokyo, Japan

[21] Appl. No.: 444,223

[22] Filed: Nov. 24, 1982

[30] Foreign Application Priority Data

Nov. 27, 1981 [JP] Japan .................. 56-189202

[51] Int. Cl.³ .............................. H01S 3/06
[52] U.S. Cl. ................. 372/87; 372/61; 372/66; 372/85; 372/88
[58] Field of Search .......... 372/61, 66, 85, 87, 372/88

[56] References Cited

U.S. PATENT DOCUMENTS 4,331,939  5/1982  Kuwabara ................. 372/92

Primary Examiner—John Lee
Assistant Examiner—Lester Rushin
Attorney, Agent, or Firm—Antonelli, Terry & Wands

[57] ABSTRACT

A gas laser has an electrode of improved construction. The electrode, for example a cathode, comprises an inner cathode and at least an outer cathode spaced from the inner cathode and disposed on the side thereof away from to an anode. Each of the cathodes has a central hole from which glow discharge is formed, and the outer cathode further has a plurality of through-holes around the central hole. A gas medium flowing in a discharge tube passes through the central hole of the inner cathode via the central hole and through-holes of the outer cathode. The gas medium forcedly enters the glow discharge from the inner cathode thereby to cause it expand and a part of the gas medium having passed through the through-holes of the outer cathode squeeze the glow discharge from the outer cathode so that the glow discharge can enter the glow discharge from the inner cathode. Therefore, the current density of the glow discharge in the discharge tube is made information.

5 Claims, 11 Drawing Figures

GAS LASER DEVICE WITH PLURAL ELECTRODE MEMBERS ON THE UPPER GAS FLOW SIDE

BACKGROUND OF THE INVENTION

This invention relates to a gas laser device having electrodes of improved construction.

An axial-flow gas laser is usually provided with a gas feed port at one end of a cylindrical discharge tube, and a gas outlet port at the other end thereof, and a gas medium is supplied from the feed port to the outlet port via the interior of the discharge tube. A mixed gas consisting of carbon dioxide ($CO_2$), nitrogen ($N_2$) and helium (He) is used as the gas medium. When the glow discharge is formed between an anode and a cathode provided in the discharge tube, an inverted population occurs in the gas medium to generate laser beams. The laser beams resonate between the reflector and output mirror provided at both ends of the discharge tube, to be taken out from the output mirror. There is a gas laser device, which has been developed with a view to improving a laser beam output, and which uses a cathode having a bore therein, i.e. a so-called ring-shaped cathode which is disclosed in U.S. Pat. No. 4,331,939. In the ring-shaped cathode, the glow discharge is formed uniformly on an inner surface of the bore therein to prevent the cathode from being locally overheated.

When the capacity of a gas laser generator is increased to a high level, for example, not less than 5–20 kW, it is necessary that the diameters of the discharge tube and cathode be increased to a great extent. Consequently, a large current is necessarily supplied to the cathode, so that the temperature of the cathode increases locally. As a result, the cathode is overheated locally, and arc discharge occurs. This makes it impossible to use the cathode practically.

Further, in the discharge tube of larger diameter than a certain diameter, for example 65 mm, the current density of glow discharge is not made uniform by a conventional cathode. Therefore, even if the large-sized discharge tube with a corresponding cathode is employed for making the capacity of a gas laser larger, the capacity does not increase corresponding to the scale of the discharge tube and the cathode.

SUMMARY OF THE INVENTION

An object of the present invention is to provide a gas laser device in which the current density of glow discharge is uniform in a discharge tube.

Another object of the present invention is to provide a gas laser device having a large capacity discharge tube provided with electrodes which can make the current density uniform in the discharge tube.

Briefly stated, the present invention is in that one of at least one pair of electrodes on the upper gas stream side of a discharge tube, for example, a cathode comprises an inner electrode member and at least one outer electrode member disposed upstream of, and spaced from, the inner electrode members, each of the electrodes member has a central bore at the inner periphery of glow discharge takes place, and the outer electrode member has a plurality of which through-bores around the central bore.

In this gas laser device, the glow discharge from the outer electrode member is moved toward the central portion of the central bore of the inner electrode member by a gas medium passed through the through-bores of the outer electrode member to enter the glow discharge from the inner electrode member without impinging upon the inner electrode member.

As a result, a local increase in the glow current density does not occur so that the glow discharge can be maintained stably, therefore, a discharge tube can be made larger in capacity or diameter, with the glow current density being kept rich.

DESCRIPTION OF THE PREFERRED EMBODIMENTS

Figure 1:
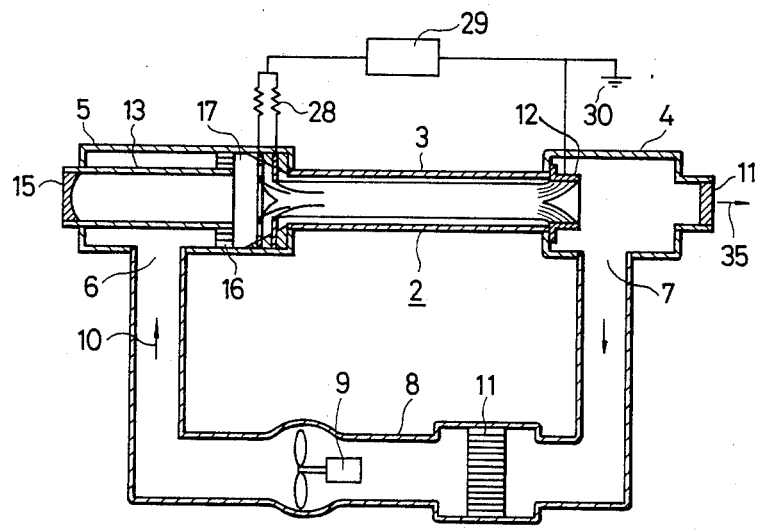
FIG. 1 is a schematic side elevational view in section of an embodiment of a gas laser according to the present invention.

An embodiment of a gas laser device 1, which is shown in FIGS. 1 to 4, according to the present invention will now be described.

A discharge tube 2 comprises a discharge tube body 3, and both end portions 4, 5, the diameter of which is greater than that of the discharge tube body 3. The end portions 4, 5 are provided with a gas feed port 6 and a gas outlet port 7, respectively, which are communicated with the interior of the discharge tube 2 and connected to a pipe 8. A blower 9 is driven to supply a gas medium 10 in the direction of an arrow to be circulated to the gas outlet port 7 through the discharge tube 2. The gas medium 10, which takes the heat away from the interior of the discharge tube 2 to have an increased temperature, is cooled in a heat exchanger 11. The gas medium 10 in use consists of a mixed gas comprising carbon dioxide ($CO_2$), nitrogen ($N_2$) and helium (He).

The end portion 4 is provided therein with an output mirror 11 of partially deflecting mirror and a ring-shaped anode 12, which are on both sides of the outlet port 7. The other end portion 5 is provided therein with a tubular member 13, which extends over the feed port 6 as shown in FIG. 1. The tubular member 13 is provided at one end thereof with a reflector 15 optically opposed to the output mirror 11, and an inner space 14 in the tubular member 13 constitutes a passage for laser beams. The tubular member 13 is further provided on the outer side of the portion thereof which is on the side of the discharge tube 2 with rectifying means having a plurality of rectifying bores 16 for passing the gas medium 10 therethrough. A stationary member 18 is provided in the interior of the end portion 5 between the tubular member 13 and discharge tube body 3 thereby providing a space 17. The stationary member 18 has an inclined surface 19 converging toward the portion thereof which is on the side of the discharge tube body 3. The stationary member 18 supports an inner cathode 20 and a first outer cathode 21 thereon and guides the gas medium flowing in the discharge tube 2.

Figure 3:
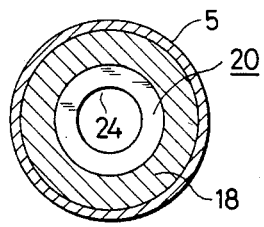
FIGS. 3 and 4 are sectional views taken along the lines III—III and IV—IV, respectively, in FIG. 2.
Figure 4:
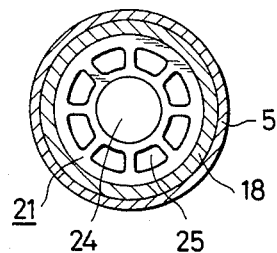

The inner cathode 20 and first outer cathode 21, which are formed as shown in FIGS. 3 and 4, are arranged in an axial direction of the discharge tube 2, spaced from each other. The inner cathode 20 and first outer cathode 21 are provided therein with central bores 24. Eight first through bores 25 are provided around the central bore 24 in the first outer cathode 21. The first through bores 25 are disposed equiangularly and spaced by the same distance from the central bore 24. Preferably, the areas of the bores 25 are the same. These cathodes 20, 21 are connected to the anode 12 through ballast resistances 28 and a DC power source 29. The anode 12 is grounded at its one end as shown by 30.

When the DC power source 29 is turned on, glow discharge 31 is formed between the anode 12 and the inner and first outer cathodes 20, 21. In the glow discharge 31, a glow discharge component 31B from the first outer cathode 21 enters an inner part of a glow discharge component 31A from the inner cathode 20. The reasons why this phenomenon occurs will be explained. The gas medium 10 entering the gas feed port 6 flows through the rectifying bores 16, whereby the gas medium flow 10 is made into a steady one, and then passes through the space 17 to move toward both the central bores 24 and through bores 25 as gas currents 10A, 10B. A part of the gas current 10A having passed through the through bore 25 enters forcedly the central bore 24 of the inner cathode 20 together with the gas current 10B having passed through the central bore 24 of the first outer cathode 21 so that the glow discharge 31A is expanded. At the same time, the outer gas flow 31A has a function to squeeze the glow discharge 31B from the first outer cathode 21. Therefore, the glow discharge 31B does not impinge upon the inner cathode 20 but enters the glow discharge 31A. As a result, the inner cathode 20 is not overheated, the current density in the discharge tube 2 becomes uniform, so that the glow discharge of a large current can be kept stable. This allows an output of laser beam 35 passing through the output mirror 11 to be improved, and a laser beam output to be kept stable or as the optical energy having a constant intensity.

Another embodiment of the gas laser device according to the present invention will be described hereinafter, referring to FIGS. 5, 6A, 6B and 6C.

Figure 5:
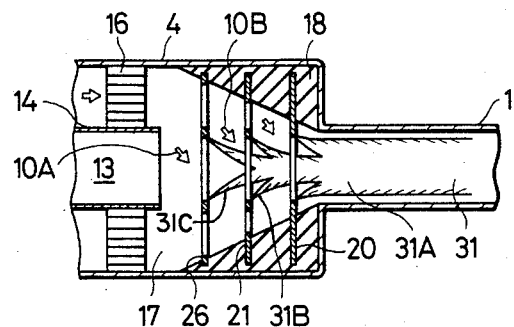
FIG. 5 is an enlarged side elevational view in section of a principal portion of another embodiment of the present invention.

The gas laser device in FIG. 5 is the same as FIGS. 1 to 4 except that the device in FIG. 5 is further provided with a second outer cathode 26 in addition to the first outer cathode 21.

The second outer cathode 26 also has a central bore 24 and second through bores 27 on the outer side thereof, and is arranged coaxially of the first outer cathode 21 and the inner cathode 20 on the outer side of the first outer cathode 21, a distance from the first outer cathode 21. The second through bores 27 are made larger than the first through bores 25. Namely, when two or more than two outer cathodes are employed, they are formed in such a manner that the sizes of the through bores in the outer cathode closer to the gas feed port are greater than those of the through bores in the outer cathode closer to the inner cathode 20. The cathode 26 is also connected to the anode 12 through ballast resistance 28 and a DC power source 29 in a similar manner to the FIG. 1 (not shown).

Glow discharge 31C formed at the central bores 24 of the second outer cathode 26 leads to the anode (not shown) through the first outer and inner cathodes 21 and 20. In this case, a gas flow 10B passing through the bore 27 is directed into two flows, a first flow passing through the through bore 25 of the first outer cathode 21 and a second flow passing through the central bore 24 of the first outer cathode 21. The second flow enters the central hole 24 of the first outer cathode 21 together with a gas flow 10A having passed through the central bore 24 of the second outer cathode 26 so that the glow discharge 31C is squeezed by the second gas flow and a glow discharge enters formed by the first outer cathode 21. The glow discharge 31C joined to the glow discharge 31B enters a glow discharge 31A formed by the inner cathode 20 in the previously mentioned manner so that the current density in the discharge tube is high and uniform.

The depths, at which the inner and first and second outer cathodes 20, 21, 26 are inserted at their respective outer circumferential portions 20A, 21A, 26A into the stationary member 18, increase gradually in the mentioned order, so that the mechanical strengths of these cathodes are very high. Although the velocity of flow of the gas increases as it flow from the second outer cathode 26 to the inner cathode 20, the second outer cathode 21 is scarcely broken owing to the above-mentioned construction for supporting the same.

Figures 6A, 6B, 6C:
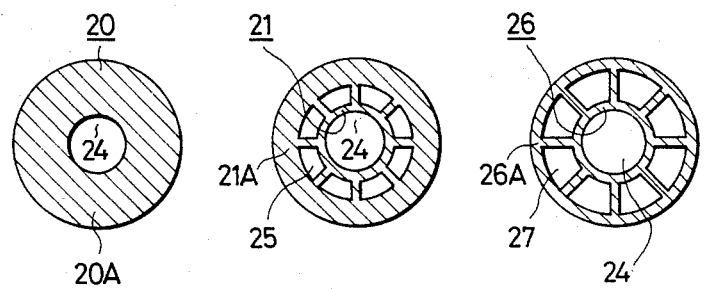
FIGS. 6A to 6C are sectional views of electrodes.
Figures 7A, 7B, 7C:
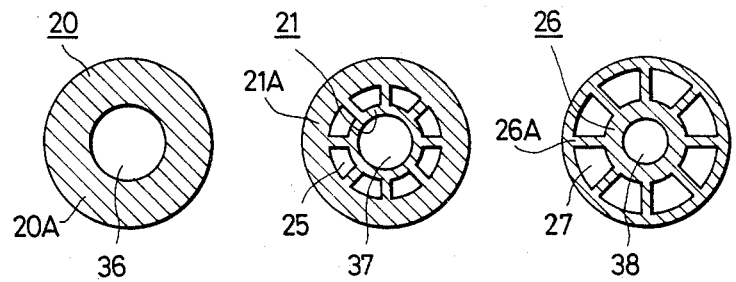
FIGS. 7A to 7C are sectional views of a modification of the electrodes shown in FIGS. 6A to 6C.

The inner and first and second outer cathodes 20, 21, 26 shown in FIGS. 7A and 7C, which are modifications of ones shown in FIGS. 6A to 6C, have first, second and third central bores 36, 37, 38, respectively. These central bores have the dimensional relation, $36 > 37 > 38$. The first and second through bores 25, 27 have the dimensional relation, $25 < 27$. Owing to the above-mentioned construction, the glow discharge from the first and second outer electrodes 21, 26 is squeezed as shown in FIG. 5 by the gas current 10B from the first and second through bores 25, 27. As a result, the glow discharge 31C from the third central bore 38 enters the glow discharge 31B in the second central bore 37, and the glow discharge 31B from the second central bore 37 enters the flow discharge 31A in the first central bore 36. Accordingly, the glow discharge from each cathode does not impinge upon the following cathode, and the discharge current density in the glow discharge in the discharge tube body becomes uniform.

Figure 2:
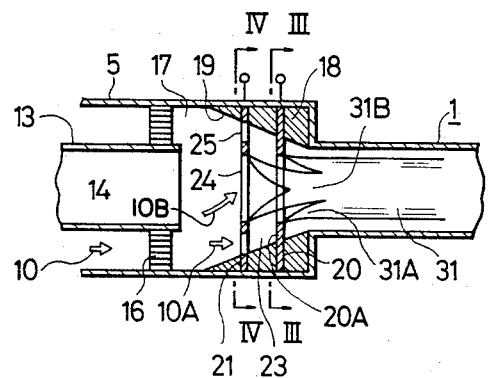
FIG. 2 is an enlarged side elevational view in section of a principal portion of the embodiment shown in FIG. 1.

The discharge tube with the cathode of thus improved construction such as in FIGS. 2, 5 can be made larger in diameter than one of the conventional discharge tube, for example, 124 mm, with large and stable current density of glow discharge flowing in the tube, so that the optical energy output per a discharge tube is greatly improved.

In the above-described embodiments, an electrode having a negative polarity is used as an upstream side electrode, and an electrode having a positive polarity as a downstream side electrode. However, even if the polarities of these electrodes are reversed, the effect of the present invention is not spoiled at all.

As described above, the gas laser according to the present invention permits improving a laser beam output and increasing the stability thereof.

What is claimed is:

1. A gas laser device comprising a discharge tube having an optical axis, a deflection mirror and an output mirror spaced from each other and provided on the optical axis in said discharge tube, a gas feed port and a gas outlet port each provided on said discharge tube between said deflection mirror and said output mirror, means provided with a heat-exchanger for circulating a gas medium from said gas feed port to said gas outlet port through said discharge tube, and at least two electrodes provided in said discharge tube between said gas feed port and said gas outlet so that a glow discharge is formed to cause said gas medium to have an inverted population and threby generate a laser beam, one of said electrodes being on an upper gas stream side of said discharge tube, the other downstream of said one, characterized in that said electrode on the upper gas stream side comprises an inner electrode member and at least one outer electrode member spaced from and disposed upstream of said inner electrode member, each of said electrode members having a central bore from which glow discharge takes place, said outer electrode member having a plurality of through-bores at portions surrounding said central bore.

2. The gas laser device as claimed in claim 1, wherein said plurality of through-bores formed in said outer electrode member are arranged equiangularly and spaced from said central bore by the same distance, the area of said plurality of through-bores being equal to one another.

3. The gas laser device as defined in claim 2, wherein two outer electrode members are spaced from and disposed upstream of said inner electrode member, both of said outer electrode members having a plurality of through-bores at portions surrounding the central bore, the total area of said through-bores in the downstream one of said two outer electrodes is smaller than that in the other upstream one.

4. The gas laser device as defined in claim 1, wherein said electrode on the upper gas stream side of said discharge tube is a cathode.

5. The gas laser device as defined in claim 1, wherein said discharge tube comprises a discharge tube body having large diameter end portions disposed at both ends of said discharge tube body, and a stationary member disposed in one of said large diameter portions on the upper gas stream side and having a conical inner face, the diameter of which becomes smaller on a lower gas stream side, said stationary member holding said inner and outer electrode members on the upper gas stream side.

* * * * *